United States Patent Office 3,380,984
Patented Apr. 30, 1968

3,380,984
ALFIN TYPE CATALYSTS, THEIR PRODUCTION AND USE IN POLYMERIZATION
William R. Birchall, Pisgah, and Edwin A. Allgeier, Cincinnati, Ohio, assignors to National Distillers and Chemical Corporation, New York, N.Y., a corporation of Virginia
No Drawing. Filed Nov. 1, 1963, Ser. No. 320,933
20 Claims. (Cl. 260—94.2)

This invention relates to a novel polymerization catalyst of the alfin-type, a method for preparing the same, and to the use of said catalyst in the polymerization of unsaturated organic compounds.

There exists a voluminous body of literature concerning alfin catalysts, methods of preparing the same and the use thereof in the polymerization of unsaturated organic compounds, particularly conjugated diolefinic hydrocarbons. These alfin catalysts as originally developed by A. A. Morton and co-workers may be defined as a complex of an alkali halide with the sodium compound of one or more methyl-n-alkyl carbinols and the sodium compound of one or more vinyl monoolefins, such vinyl monoolefin either having at least one alkyl group attached to a carbon atom of the vinyl group or having two alkyl groups attached one to each of the carbon atoms of the vinyl group. The preferred example of the alkali halide is sodium chloride. An example of the sodium compound of the methyl-n-alkyl carbinols is sodium isopropoxide. An example of the sodium compound of the vinyl monoolefins is allyl sodium.

These catalysts have been found to possess particular utility in the polymerization of conjugated diolefinic hydrocarbons, e.g., butadiene, with or without comonomers, such as vinyl aromatics including styrene, to produce synthetic elastomers. The use of an alfin catalyst results in an unusually rapid rate of reaction and in good yields of polymer. In comparison with synthetic rubbers made by conventional catalytic polymerizing techniques, the alfin rubbers are generally gel-free and have higher flex-life values, high tensile strength, and superior abrasion resistance and tear strength. Alfin rubbers, however, have the disadvantage of being characterized by extremely high molecular weights (in general over 2,000,000 and often over 5,000,000). Because of such high molecular weights, these rubbers are very tough and exhibit little breakdown and extremely poor banding on being milled. They are, therefore, very difficult to process using conventional equipment and conventional procedures, and attempts to compound them result in very rough stocks with relatively high shrinkage and exceedingly high viscosities.

In view of the above-described disadvantages associated with the extremely high molecular weight polymers produced by conventional alfin polymerization, efforts have been made to modify the process whereby polymers having substantially lower molecular weights would be produced. In U.S. Patent No. 3,067,187 a process is described wherein a conventional alfin catalyst process is conducted in the presence of certain molecular weight moderator compounds, namely dihydro aromatic hydrocarbons, e.g., 1,4-dihydrobenzene and 1,4-dihydronaphthalene, to yield alfin-type polymers possessing a lower and more desirable molecular weight range, e.g., 1,250,000 or below.

The alfin-type catalysts of this invention are particularly well adapted to the polymerization of butadiene itself, i.e., 1,3-butadiene, and to the copolymerization of 1,3-butadiene and styrene, but are also applicable to the formation of polymers and copolymers of other unsaturated organic compounds as, for example, other butadienes, such as 2,3-dimethyl-1,3-butadiene, isoprene, piperylene, 3-furyl-1,3-butadiene, 3-methoxyl-1,3-butadiene, and the like; aryl olefins such as styrene, various alkyl styrenes, p-chlorostyrene, p-methoxystyrene, alpha-methylstyrene, and similar derivatives; and the like.

The catalysts are also effective when a monomeric material such as listed above is copolymerized with one or more other compounds which are copolymerizable therewith, such as aryl olefins.

In addition to using as the monomer pure or rubber-grade butadiene, which contains about 99.6 weight percent of butadiene, the polymerization process of this invention can be applied to impure or dilute butadiene, which contains about 12 to about 40 weight percent of butadiene. The composition of the polymer prepared from a lean butadiene stream, however, is the same as that prepared from pure butadiene, that is, about 30% of the 1,2-isomer and about 70% of the trans-1,4 isomer.

According to prior art teachings, alfin catalysts are generally prepared by reacting amyl chloride and metallic sodium in a hydrocarbon solvent, e.g., pentane, to produce amyl sodium which is then reacted first with isopropyl alcohol and then with propylene to form the final catalyst containing sodium chloride, sodium isopropoxide, and allyl sodium. This procedure is illustrated by the following equations:

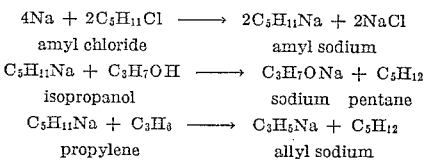

$$4Na + 2C_5H_{11}Cl \longrightarrow 2C_5H_{11}Na + 2NaCl$$
amyl chloride → amyl sodium $$C_5H_{11}Na + C_3H_7OH \longrightarrow C_3H_7ONa + C_5H_{12}$$
isopropanol → sodium  pentane $$C_5H_{11}Na + C_3H_6 \longrightarrow C_3H_5Na + C_5H_{12}$$
propylene → allyl sodium Final catalyst: $2NaCl:1\ C_3H_5Na:1\ C_3H_7ONa$.

The above reaction must be conducted in the absence of air and water and requires refrigeration in order to maintain the temperature of the reaction mixture between $-20°$ and $+20°$ C., since the reactions are exothermic and temperatures above those indicated result in a breakdown of the catalyst.

A modification of the above-described conventional procedure, disclosed in copending application Ser. No. 271,487, in the names of Hoffman and Morgan, filed Apr. 8, 1963, involves reversing the order of addition of the methyl-n-alkyl carbinol and the alkyl halide. As a result, alkyl halide and sodium are conserved, and the need for refrigeration during preparation of the catalyst is eliminated.

In spite of the process improvements described above, it would be highly desirable to reduce further the costliness of alfin-type catalysts, particularly by eliminating the need for the rather expensive alkyl halides necessary in the preparation methods conventionally employed as described above as well as in the improved method described in copending application Ser. No. 271,487. Furthermore, it would be highly desirable to be able to produce alfin-type polymers of relatively low molecular weight directly from an alfin-type catalyst without requiring the presence of added molecular weight moderators such as the dihydroaromatic hydrocarbons disclosed in U.S. Patent 3,067,187.

Accordingly, it is one object of this invention to provide a novel alfin-type catalyst.

It is a further object of this invention to provide a method for producing an alfin-type catalyst that utilizes lower cost ingredients.

A still further object is to provide a method for the preparation of an alfin-type catalyst which eliminates the need for alkyl halides as a reactant.

Another object is to provide a highly efficient alfin-type catalyst which can polymerize unsaturated organic compounds to alfin-type polymers of relatively low molecular weight without requiring the use of added molecular weight moderators.

A further object is to provide a method of polymerizing unsaturated organic compounds employing the novel alfin-type catalyst of this invention.

Other objectives of this invention will become apparent from the detailed description set forth below.

The present invention is based on the discovery that certain active dialkali metal compounds will complex with an alkali metal alcoholate and a finely-divided alkali metal halide to produce a highly active alfin-type catalyst. These active dialkali metal compounds are disodio dimers derived from the controlled selective reaction of finely-dispersed metallic sodium in an active ether with hydrocarbons selected from the group consisting of conjugated aliphatic diolefins and vinyl aromatic compounds.

The aliphatic conjugated diolefins which undergo this selective dimerization may be represented by the following formula:

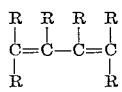

wherein R is hydrogen or a saturated hydrocarbon radical, preferably of from one to four carbon atoms. The R groups may be the same or different in a single compound. Examples of specific compounds include butadiene, isoprene, 1,3-hexadiene, dimethyl butadiene, the pentadienes, e.g., the methyl-1,3-pentadienes, and the like. In general, it is desirable to use the conjugated diolefins having from four to eight, inclusive, carbon atoms. The method is particularly well adapted to the use of butadiene as the diolefin.

The resultant dialkali metal dimers of the aliphatic conjugated diolefins may be represented by the following generalized formula:

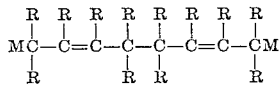

wherein M is an alkali metal, e.g., sodium, lithium, potassium, ribidium, or cesium, with sodium being especially preferred, and R is as defined previously. Examples of these dimers include disodiooctadiene, dilithiooctadiene, dicesiooctadiene, all derived from butadiene; dimethyl disodiooctadiene, derived from isoprene; tetramethyl disodiooctadiene, derived from dimethyl butadiene; and so on. In general, the dimers preferred have from 8 to 16, inclusive, carbon atoms.

The vinyl aromatic compounds which undergo selective dimerization to disodio dimers include styrene, chain-substituted styrenes such as alpha-methyl styrene, and ring-substituted styrenes such as, for example, the ortho, meta,. and para methyl styrenes, the ethyl styrenes, and the like. In general, it is desirable to use styrene and alkyl-substituted styrenes in which the alkyl group or groups have from one to four carbon atoms; however, aryl-substituted styrenes may also be employed. The method is particularly well adapted to the use of styrene or alpha-methyl styrene as the vinyl aromatic compound. If the vinyl aromatic reactant used is other than styrene, then the disodio derivatives corresponding to such structure are obtained.

The generalized formula for these compounds is as follows:

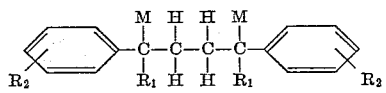

In the above formula, $R_1$ and $R_2$ represent either alkyl groups having from one to four, inclusive, carbon atoms, hydrogen atoms, or aryl groups, e.g., phenyl, naphthyl, etc., and M is an alkali metal. Especially preferred are 1,4-disodiodiphenylbutane, which may be derived from styrene, and disodiodiphenylhexane, which may be derived from alpha-methyl styrene.

The above-discussed dialkali metal dimers of the vinyl aromatic compounds and aliphatic conjugated diolefins may be prepared by the method fully described in U.S. Patents 2,816,913 and 2,816,916 to Frank et al., as well as in U.S. Patent 3,067,245 to Rowland. As disclosed in these patents, the dialkali metal dimers are prepared by treating the aliphatic conjugated diolefin or vinyl aromatic compound with finely-dispersed alkali metal, particularly sodium or potassium, in a liquid ether reaction medium in the presence of a relatively small amount of a polycyclic aromatic compound. Since the dimerization process is fully disclosed in these patents, no detailed discussion is required here and the disclosure of said patents is incorporated by reference thereto.

When the, e.g., disodio dimers are prepared according to the method described in the just discussed patents, the active ether component of the solvent present during the preparation should be removed prior to use for the production of a novel catalyst of this invention. This is conveniently done by a flash distillation of the active ether at a temperature below 190° F., thereby leaving the disodio dimer in the form of a slurry in the inert liquid, generally an inert hydrocarbon, in which the sodium dispersion was originally prepared. It is in this form in which the disodio dimer is preferred for use in this invention.

Referring to the disodio derivative as the preferred dialkali metal dimer in the following description, the function of the said disodio compounds in the novel alfin-type catalyst appears to be that served in part by the allyl sodium in conventional alfin catalysts. It will be noted that the disodio dimers of the conjugated aliphatic dienes are diallylic sodium compounds. The disodio dimers of the vinyl aromatic compounds, while not diallylic in the strict interpretation of the term, are diallylic in nature in view of the olefinic character of the aromatic resonance bonds to which the sodium-containing carbons are adjacent. It should be further noted, however, that use of these diallylic or diallylic-type compounds does not merely obviate the need for the production of allyl sodium as is required in a conventional alfin catalyst. Use of these compounds not only eliminates the need for costly organo-halides, such as amyl chloride, but provides a novel alfin-type catalyst which can be prepared more cheaply, with greater flexibility, and which possesses unexpectedly greater activity in comparison to conventional alfin catalysts.

In one embodiment of the present invention, a methyl-n-alkyl carbinol, preferably isopropanol, is reacted with an active disodio dimer, preferably disodiooctadiene, in an inert hydrocarbon to produce a 1:1:1 molar mixture of disodiooctadiene, octadiene, and sodium isopropoxide. A finely-divided alkali metal salt, preferably sodium chloride that has been prepared by comminution or by reaction between a halide and sodium, is added and the mixture stirred vigorously to a uniform suspension. Other alkali metal halides and salts conventionally complexed in alfin catalysts may also be used.

These reactions take place at ambient temperature with no provision for cooling other than that necessary to remove the heat of reaction of the isopropanol-disodiooctadiene reaction step.

The reaction may be summarized as follows:

$4NaCl^a + 3Na_2C_8H_{12}{}^b + 2C_3H_7OH^c \rightarrow$
$\qquad 2Na_2C_8H_{12}{}^d + 2C_3H_7ONa^e + C_8H_{14}{}^f + 4NaCl^g$

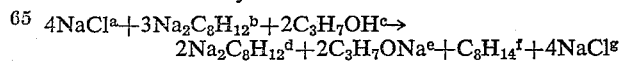

The final catalyst is: $2NaCl:1Na_2C_8H_{12}:1C_3H_7ONa$.

In order to insure high purity and efficient catalyst preparation, the above mixture must be made in a water-free system in an inert atmosphere. Cooling is required only for the alcohol reaction step. The maximum allowable temperature is about 140° F. Above this temperature the disodiooctadiene begins to decompose.

In another embodiment of the present invention, none of the catalyst ingredients is prepared in situ. Instead, each of the ingredients is preformed and then mixed together in the desired ratios. For example, disodiooctadiene prepared by the aforedescribed dimerization reaction, sodium isopropoxide prepared by the reaction of dispersed sodium with isopropanol, and finely-divided sodium chloride may be combined in any desired order to form the active catalyst mixture. Preferably, the isopropoxide is first prepared by adding to a dispersion of sodium in an inert hydrocarbon medium an equimolar quantity of isopropanol and, upon completion of the ensuing reaction, adding to the isopropoxide suspension the disodiooctadiene and sodium chloride. The completed mixture should be stirred for a short period, e.g., fifteen minutes or longer, to insure intimate contact of all the catalyst components. This method of preparation, in addition to eliminating the need for costly organohalides, guarantees that the proper amount of the allylic or allylic-type sodium component will be available for reaction in the subsequent polymerization reaction since none of this component is required for formation of the alkoxide.

The subject catalyst can be prepared to include sodium chloride, sodium isopropoxide, and disodiooctadiene or equivalent components as previously discussed in ratios varying from 1:1:1 to 10:10:1 with little or no effect on product yields. Preferably, ratios ranging from about 1:1:1 to 3:2:1 are employed.

In conducting polymerization or interpolymerization reactions with the catalysts of this invention, there should generally be used in relation to the weight of monomer about 0.5 to 2 percent by weight of catalyst, based on the total sodium content, and preferably about 0.75 to 1.25 percent by weight. The polymerization reaction generally takes place at atmospheric pressure and ambient temperature in a suitably inert reaction medium. Pressure and temperature conditions may vary over a substantial range as between about 1 atmosphere and about 100 atmospheres pressure and at temperatures between about 0° and 138° F. The reaction medium, as well as the medium for the catalyst preparation, is suitably an inert hydrocarbon, e.g., pentane, hexane, a 1:1 mixture of pentane and hexane, petroleum alkylate, cyclohexane, decalin, heptane, and the like, or mixtures thereof, with hexane and petroleum alkylate being preferred. Rigorous exclusion of water, air, and other agents deleterious to the catalyst from the monomer and apparatus must be observed if proper catalyst efficiency is to be obtained.

The polymerization and recovery processes may be conducted in a batchwise, semi-continuous, or continuous manner by any of the conventional techniques used for solution process rubber.

A particularly significant advantage of the novel catalysts of this invention is their ability to polymerize unsaturated organic compounds with much greater efficiency than conventional alfin catalysts of the Morton type. Not only can a given amount of monomer be polymerized with about one-half the equivalents of catalyst or allylic groups normally required, but most important the resultant product is of a much more desirable molecular weight. Apparently, the allylic or allylic-type sodium groupings of the present catalysts exert a much greater activity in the initiation of new polymer chains than the corresponding groups of conventional alfin catalysts. The products exhibit molecular weights of less than about 1,250,000, generally in the range of about 300,000 to 750,000. While retaining the properties of high flex life, high tensile strength, and superior abrasion resistance and tear strength characteristic of conventional alfin polymers, they possess the added advantage of being very easy to mill, process, or blend. Alfin-type polymers of such characteristics have heretofore been prepared only through the incorporation of molecular weight modifiers, such as described in U.S. Patent No. 3,067,187. It is an added feature of the present process that such modifiers, e.g., 1,4-dihydrobenzene, 1,4-dihydronaphthalene, and others, may be employed in conjunction with the subject novel catalyst to enhance even further polymerization efficiency and control in obtaining low molecular weight alfin-type polymers of desirable characteristics.

Detailed practice of this invention is shown in the following examples. These examples are illustrative only and are not meant to limit the scope of the invention except as indicated in the appended claims. All parts are expressed by weight unless otherwise specified.

Average molecular weights for the polymers of the following examples were determined, where possible, by preparing 0.1 and 1.0 percent solutions of the polymer in toluene, determining their viscosity at 25° F., extrapolating the intrinsic viscosity to infinite dilution, and then applying standard viscosity-molecular weight laws. For conversion of intrinsic viscosity to molecular weight, use was made of the Staudinger Equation $M^a = n/k$, where $M$ is the molecular weight, $n$ is the intrinsic viscosity, and $k$ and $a$ are constants which have been predetermined for similar polymers of known molecular weight.

EXAMPLE 1

A. Preparation of conventional alfin catalyst

Dry hexane (660 parts) was charged to a 3-necked flask provided with stirrer, inert gas sweep, a Dry Ice reflux condenser system, and an external cooling bath. To this was added 132.4 parts of finely-divided sodium (2 microns maximum particle size) (1.6 gram-atoms) dispersed in alkylate. The slurry was cooled to —10° C., and 102 parts of dry n-amyl chloride (0.84 mole) was added slowly with moderate stirring which was continued for one hour after the addition had been completed. Then 30.6 parts of isopropyl alcohol (0.4 mole) was added slowly. Stirring was then maintained for an additional 45 minutes. Excess dry propylene (C.P. grade) was subsequently introduced into the mixture, the temperature of which was maintained at —10° C. until active reflux of the propylene occurred. The temperature was then raised gradually to 25° C., and the mixture was stirred at this temperature for two hours. During the last 15 minutes the propylene was allowed to leave the system and was collected for recycle. The reaction slurry was transferred to a storage vessel maintained in an inert atmosphere of argon and was then diluted to 1120 parts with dry hexane. This slurry, that is, the alfin catalyst, contained 0.4 mole of sodium isopropoxide, 0.4 mole of allyl sodium, and 0.8 mole of sodium chloride.

B. Polymerization

Thirty parts of dry butadiene (about 98 weight percent) was dissolved in 100 parts of dry hexane at about —10° C. Alfin catalyst as just described (17.5 parts, containing 0.065 part of solid per part) was added to the butadiene-hexane solution, and the system was sealed and maintained at room temperature with intermittent shaking in a pressure flask. After 15 minutes of reaction, a tough, gelatinous semisolid was obtained. The system was opened and ethanol added to destroy the catalyst and to precipitate the product. The product was then washed intermittently with ethanol and water containing antioxidant to remove soluble inorganic residues (such as sodium isopropoxide and sodium chloride). The resulting insoluble material was wet, white solid polybutadiene. It was given a final wash with acetone containing an antioxidant, N-phenyl-2-naphthylamine, and then dried in an oven at 40° C. under vacuum. A 96 percent yield, based on the charged weight of butadiene, was obtained. The polymer was intractable and difficult to handle. It had a molecular weight in excess of 2,000,000.

EXAMPLE 2

A. Preparation of catalyst-embodiment (a)

Two hundred and twenty grams of dry hexane was charged to a 3-necked flask provided with stirrer, thermometer, and inert gas-blanketing system. The flask was purged thoroughly with nitrogen to sweep out all air. 0.45 mole (69 g.) of disodiooctadiene was added carefully to avoid all air contact. Stirring was started, and 27.6 g. (0.46 mole) of isopropanol was added over a period of 10 minutes and permitted to react for 30 minutes. The temperature during the reaction period reached 135° F.

0.75 mole of finely-divided sodium chloride was added and the reaction mass stirred for 30 minutes. The mixture was adjusted with hexane to provide a slurry containing 0.03 g. of catalyst solid per g. This slurry contained 0.75 mole of sodium chloride, 0.46 mole of sodium isopropoxide, 0.27 mole of disodiooctadiene, and 0.18 mole of octadiene for an approximate molar ratio 3:2:1:1.

B. Polymerization

Thirty grams of 1,3-butadiene was dissolved in 100 g. of dry hexane at 32° F. in a clean dry reaction flask. 17.5 grams of catalyst slurry from Part A (containing 0.525 g. of catalyst solids) was charged to the butadiene/hexane mixture; the system was sealed and shaken intermittently for one hour.

At the end of the polymerization period the polymer was isolated by the addition of a quantity of methanol sufficient to destroy the catalyst and precipitate the polymer. The precipitated solids were washed three times with 20 parts of water to dissolve and wash out the catalyst residue.

The resulting isolated polymer was a white solid polybutadiene exhibiting a molecular weight of 400,000. The yield based on butadiene charged with slightly above theoretical due to the incorporation of octadiene units into the polymer chain. The presence of these units in the polymer chain was confirmed by nuclear magnetic resonance.

EXAMPLE 3

A. Preparation of catalyst-embodiment (b)

Two hundred and twenty grams of dry hexane was charged to a 3-necked flask provided with stirrer, thermometer, and inert gas-blanketing system. The flask was purged thoroughly with nitrogen to sweep out all air. 10.58 grams (0.46 g. atom) of sodium dispersion was added followed by 27.6 g. (0.46 mole) of isopropanol. The isopropanol was added slowly to reduce the rate of heat evolution and for safety purposes. When all of the isopropanol had been added, stirring was continued for 30 minutes to insure complete reduction to sodium isopropoxide.

0.23 mole (35.0 g.) of disodiooctadiene was added carefully to avoid all air contact. Stirring was continued, 0.75 mole of finely-divided sodium chloride was added, and the reaction mass was allowed to stir for 30 minutes. The mixture was adjusted with hexane to provide a slurry containing 0.03 g. of catalyst per g. This slurry contained 0.75 mole of sodium chloride, 0.46 mole of sodium isopropoxide, and 0.23 mole of disodiooctadiene for an approximate molar ratio of 3:2:1.

B. Polymerization

Thirty grams of 1,3-butadiene was dissolved in 100 g. of dry hexane at 32° F. in a clean dry reaction flask. 17.5 grams of catalyst slurry from Part A was charged to the butadiene/hexane mixture; the system was sealed and shaken intermittently for one hour.

At the end of the polymerization period the polymer was isolated by addition of a quantity of methanol sufficient to destroy the catalyst and precipitate the polymer. The precipitated solids were washed three times with 20 ml. of water to dissolve and wash out the catalyst residue.

The resulting isolated polymer was a white solid polybutadiene exhibiting a molecular weight of 700,000. The yield in this case was slightly below theoretical.

EXAMPLE 4

Example 3 was repeated except 5 g. of 1,4-dihydronaphthalene (DHN) was added to the reaction flask prior to the catalyst addition to act as a molecular weight control agent. The resultant polymer had a molecular weight of 180,000.

EXAMPLE 5

The procedure for Example 3 was repeated except that a 90/10 weight percent mixture of butadiene and styrene and an 80/15 weight percent mixture of butadiene and isoprene were used instead of butadiene alone. The following results were obtained from these experiments:

| DHN Moderator, parts per part of monomer | Weight percent in feed stream | | | Polymer Yield, percent | Molecular Weight |
|---|---|---|---|---|---|
| | Butadiene | Styrene | Isoprene | | |
| 0.0 | 90 | 10 | -------- | 100.0 | 400,000 |
| 5.0 | 85 | 10 | 5 | 99.3 | 190,000 |
| 5.0 | 85 | -------- | 15 | 97.2 | 170,000 |
| 5.0 | 70 | 10 | -------- | 101.0 | 195,000 |

EXAMPLE 6

When the procedure of Example 3 is repeated using other dialkali metal-dioctadienes, e.g., dipotassium or dilithium dioctadiene in place of disodiooctadiene, substantially similar polymerization activity is found in the prepared catalyst. Similarly, when dimethyl dialkali metal-octadiene prepared from isoprene or tetramethyl dialkali metal-octadiene prepared from dimethyl butadiene is utilized in the preparation of the catalyst, satisfactory polymerization results are obtained.

EXAMPLE 7

A. Preparation of catalyst

Two hundred and twenty grams of dry hexane was charged to a 3-necked flask provided with stirrer, thermometer, and inert gas-blanketing system. The flask was purged thoroughly with nitrogen to sweep out all air. 0.45 moles (114.4 g.) of disodiodiphenylbutane was added carefully to avoid all contact with air. Stirring was started: 27.6 g. (0.46 mole) of isopropyl alcohol was added over a period of 15 minutes and permitted to react for 30 minutes. The temperature during the reaction period reached 140° F.

0.75 mole of finely-divided sodium chloride was added and the reaction mass stirred for 40 minutes. The mixture was adjusted with dry hexane to provide a slurry containing 0.03 g. of catalyst solid per g. This slurry contained 0.75 mole of sodium chloride, 0.46 mole of sodium isopropoxide, 0.25 mole of disodiodiphenylbutane, and 0.20 mole of diphenylbutane for an approximate molar ratio 3:2:1:1.

B. Polymerization

Thirty grams of 1,3-butadiene was dissolved in 100 g. of dry hexane at 32° F. in a clean dry pressure flask. 18.0 grams of catalyst slurry from Part A (containing 0.540 g. of catalyst solids) was charged to the butadiene/hexane mixture; the system was sealed and shaken intermittently for one hour.

At the end of the polymerization period the polymer was isolated by addition of a quantity of methanol sufficient to destroy the catalyst and precipitate the polymer. The precipitated solids were washed three times with 20 parts of water to dissolve and wash out the catalyst residue.

The resulting isolated polymer was a white solid polybutadiene exhibiting a molecular weight of 350,000. The yield based on butadiene charged was slightly above theoretical due to the addition of diphenylbutane to the chain.

The foregoing disclosure has described novel alfin-type catalysts and methods for preparing the same which avoid the difficulties normally found in preparing alfin catalysts. The reactant addition steps are reduced to a minimum; reaction temperature control no longer presents a problem; and difficult reaction steps such as the formation of alkyl sodium from amyl sodium and propylene are avoided. There has also been disclosed a method for the polymerization of unsaturated organic compounds utilizing the novel catalysts of this invention whereby the polymers produced have not only a much more desirable molecular weight range than is produced by conventional alfin polymerization methods with known alfin catalysts, but where, moreover, the yield of polymer produced is increased to substantially theoretical. The polymeric products produced by the method of this invention thereby retain the properties of high flex life, high tensile strength, and superior abrasion resistance and tear-strength characteristics of conventional alfin polymers, while possessing the added advantage of being easy to mill, process, and blend.

Many modifications of this invention will be apparent to those skilled in the art upon study of the foregoing disclosure. Such modifications are deemed to be within the spirit and scope of this invention.

What is claimed is:

1. An alfin-type catalyst comprising an intimate mixture in an inert diluent of a dialkali metal diallylic-type hydrocarbon compound, an alkali metal salt of a methyl-n-carbinol, and a finely-divided alkali metal halide.

2. An alfin-type catalyst comprising an intimate mixture in an inert diluent of an alkali metal alkoxide of a methyl-n-carbinol, a finely-divided alkali metal halide, and a compound selected from the group consisting of dialkali metal aliphatic conjugated diolefin dimers and dialkali metal vinyl aromatic dimers.

3. An alfin-type catalyst comprising an intimate mixture in an inert diluent of an alkali metal alkoxide of a methyl-n-carbinol, a finely-divided alkali metal halide, and a dialkali metal diallylic-type hydrocarbon compound selected from the group represented by the formulas

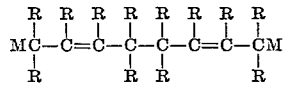

wherein M is an alkali metal and R is selected from the group consisting of hydrogen and a saturated hydrocarbon radical of from one to four carbon atoms and

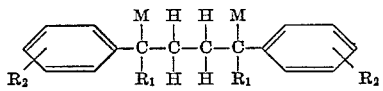

wherein $R_1$ and $R_2$ are selected from the group consisting of alkyl groups having one to four carbon atoms and hydrogen atom and M is an alkali metal.

4. An alfin-type catalyst comprising an intimate mixture in an inert hydrocarbon diluent of disodiooctadiene, sodium isopropoxide, and finely-divided sodium chloride.

5. The catalyst of claim 4 wherein the molar ratio of sodium chloride to sodium isopropoxide to disodiooctadiene is in the range of about 1:1:1 to 3:2:1.

6. A process for producing an alfin-type catalyst which comprises
   (a) reacting a methyl-n-alkyl carbinol with an excess of a dialkali metal diallylic-type hydrocarbon compound in an inert liquid medium to form a mixture comprising the alkali metal alkoxide of said methyl-n-alkyl carbinol and said dialkali metal diallylic-type compound,
   (b) introducing a finely-divided alkali metal halide, and
   (c) stirring the reaction mixture vigorously to obtain a uniform suspension.

7. The process of claim 6 wherein said dialkali metal diallylic-type hydrocarbon compound is selected from the group consisting of dialkali metal aliphatic conjugated diolefin dimers and dialkali metal vinyl aromatic dimers.

8. The process of claim 6 wherein said inert liquid medium is an inert hydrocarbon.

9. The process of claim 6 wherein the dialkali metal diallylic-type compound is disodiooctadiene and said alkali metal halide is sodium halide.

10. The process of claim 9 wherein the methyl-n-alkyl carbinol is isopropanol.

11. The process of claim 7 wherein said dialkali metal aliphatic conjugated diolefin dimer has the formula

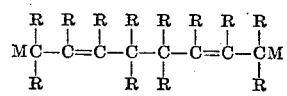

wherein M is an alkali metal and R is selected from the group consisting of hydrogen and a saturated hydrocarbon radical of from one to four carbon atoms and said alkali metal vinyl aromatic dimer has the formula

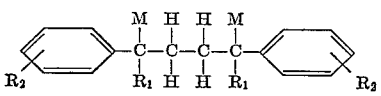

wherein $R_1$ and $R_2$ are selected from the group consisting of alkyl groups having one to four carbon atoms and hydrogen atom and M is an alkali metal.

12. A process for producing an alfin-type catalyst which comprises
   (a) mixing isopropanol with an excess of disodiooctadiene in an inert liquid medium to form a mixture comprising sodium isopropoxide and disodiooctadiene,
   (b) introducing finely-divided sodium chloride, and
   (c) stirring the reaction mixture vigorously to obtain a uniform suspension.

13. A process for producing an alfin-type catalyst which comprises mixing a compound selected from the group consisting of dialkali metal aliphatic conjugated diolefin dimers and dialkali metal vinyl aromatic dimers with an alkali metal alkoxide of a methyl-n-alkylcarbinol and a finely-divided alkali metal halide and thereafter admixing these compounds in an inert diluent.

14. A process for producing an alfin-type catalyst which comprises mixing a dialkali metal diallylic-type hydrocarbon selected from the group represented by the formula

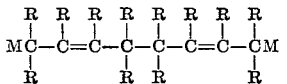

wherein M is an alkali metal and R is selected from the group consisting of hydrogen and a saturated hydrocarbon radical of from one to four carbon atoms and

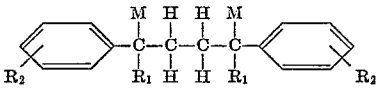

wherein $R_1$ and $R_2$ are selected from the group consisting of alkyl groups having one to four carbon atoms and hydrogen atom and M is an alkali metal with an alkali metal salt of a methyl-n-alkyl-carbinol and a finely-divided alkali metal halide and thereafter admixing these compounds in an inert diluent.

15. A process for producing an alfin-type catalyst which comprises mixing disodiooctadiene, sodium isopropoxide, and finely-divided sodium chloride and thereafter admixing these compounds in an inert hydrocarbon diluent.

16. In the process of polymerizing and copolymerizing conjugated diolefinic hydrocarbons, vinyl aromatics or mixtures thereof, the improvement comprising conducting said polymerization in the presence of an alfin-type catalyst as defined in claim 2.

17. In the process of polymerizing and copolymerizing conjugated diolefinic hydrocarbons, vinyl aromatics or mixtures thereof, the improvement comprising conducting said polymerization in the presence of an alfin-type catalyst as defined in claim 3.

18. In the process of polymerizing and copolymerizing conjugated diolefinic hydrocarbons, vinyl aromatics or mixtures thereof, the improvement comprising conducting said polymerization in the presence of an alfin-type catalyst as defined in claim 4.

19. In the process of polymerizing and copolymerizing conjugated diolefinic hydrocarbons, vinyl aromatics or mixtures thereof, the improvement comprising conducting said polymerization in the presence of an alfin-type catalyst as defined in claim 3 and a molecular weight modifier selected from the group consisting of 1,4-dihydrobenzene and 1,4-dihydronaphthalene.

20. In the process of polymerizing and copolymerizing conjugated diolefinic hydrocarbons, vinyl aromatics or mixtures thereof, the improvement comprising conducting said polymerization in the presence of an alfin-type catalyst as defined in claim 4 and a molecular weight modifier selected from the group consisting of 1,4-dihydrobenzene and 1,4-dihydronaphthalene.

References Cited

UNITED STATES PATENTS 3,067,187    12/1962    Greenberg et al. __ 260—94.2 X

OTHER REFERENCES

Morton et al., "The Metalation of Olefins and Dienes and their Use in Alfin Polymerization of Butadiene," Journal of the Amer. Chem. Soc., 72, 3785–92 (1950).

JOSEPH L. SCHOFER, *Primary Examiner.*

H. I. CANTOR, W. F. HAMROCK, *Assistant Examiners.*